(12) United States Patent
Erestam

(10) Patent No.: US 11,100,596 B2
(45) Date of Patent: Aug. 24, 2021

(54) DEVICE FOR DETERMINING A CONSTRUCTION DEVICE SCHEDULE

(71) Applicant: HUSQVARNA AB, Huskvarna (SE)

(72) Inventor: Anders Erestam, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 152 days.

(21) Appl. No.: 16/089,056

(22) PCT Filed: Mar. 13, 2017

(86) PCT No.: PCT/SE2017/050239
§ 371 (c)(1),
(2) Date: Sep. 27, 2018

(87) PCT Pub. No.: WO2017/171607
PCT Pub. Date: Oct. 5, 2017

(65) Prior Publication Data
US 2019/0130501 A1    May 2, 2019

(30) Foreign Application Priority Data
Mar. 30, 2016  (SE) .................................. 1650409-4

(51) Int. Cl.
G06Q 50/06    (2012.01)
G06Q 50/08    (2012.01)
G06Q 10/06    (2012.01)

(52) U.S. Cl.
CPC ....... *G06Q 50/08* (2013.01); *G06Q 10/06311* (2013.01); *G06Q 10/06314* (2013.01); *G06Q 50/06* (2013.01)

(58) Field of Classification Search
USPC ...................................................... 705/7.24
See application file for complete search history.

(56) References Cited

U.S. PATENT DOCUMENTS

| 5,227,668 | A | * | 7/1993 | Mutch | .................. G01R 22/066 |
| | | | | | 307/131 |
| 5,322,449 | A | * | 6/1994 | Pizano | .................. H01R 31/06 |
| | | | | | 439/222 |
| 2014/0070924 | A1 | | 3/2014 | Wenger et al. | |
| 2014/0107853 | A1 | * | 4/2014 | Ashinghurst | ............. B25F 5/00 |
| | | | | | 700/297 |

(Continued)

FOREIGN PATENT DOCUMENTS

| EP | 1 533 767 A1 | 5/2005 |
| WO | 2015/014524 A1 | 2/2015 |

OTHER PUBLICATIONS

Cheng et al. (C. S. Cheng and D. Shirmohammadi, "A three-phase power flow method for real-time distribution system analysis," in IEEE Transactions on Power Systems, vol. 10, No. 2, pp. 671-679, May 1995, doi: 10.1109/59.387902.)*

(Continued)

*Primary Examiner* — Matthew D Henry
(74) *Attorney, Agent, or Firm* — Burr & Forman, LLP

(57) ABSTRACT

A construction device scheduling device is provided including processing circuitry configured to receive device identifiers associated with a plurality of construction devices, receive a construction plan, and determine a construction device schedule based on the device identifiers of the plurality of construction devices and the construction plan.

20 Claims, 5 Drawing Sheets

(56) References Cited

U.S. PATENT DOCUMENTS

2017/0046799 A1\* 2/2017 Chan .................. G06Q 20/102

OTHER PUBLICATIONS

International Search Report and Written Opinion for International Application No. PCT/SE2017/050239 dated Apr. 5, 2017.
International Preliminary Report on Patentability for International Application No. PCT/SE2017/050239 dated Oct. 2, 2018.

\* cited by examiner

DEVICE FOR DETERMINING A CONSTRUCTION DEVICE SCHEDULE

TECHNICAL FIELD

Example embodiments generally relate to construction equipment and, more particularly, relate to determining a construction device schedule.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like.

Construction sites may be a dynamic work environment including multiple jobs occurring simultaneously. In some instances, a series of jobs, or construction device operations may be designated to occur in the same physical location or area. The construction device operations which are designated for the same area of the construction site may be prevented from simultaneous performance, due to construction order, physical limitations of the space, electrical power availability, or the like. A foreman may determine a schedule for operations and manage construction crews in the execution of the schedule.

Some construction sites may have limited electrical power access. Some construction sites may receive electrical power form a portable generator and an electrical distribution system of cabling. The portable generator may have a power rating which could be exceeded if too many construction devices are running or started simultaneously. In other examples, such as refurbishing a building or later in a construction project, electricity may, additionally or alternatively, be provided by the electric grid via a building electrical system. Although typically higher than a portable generator, the building electrical system connected to the electric grid also includes a power rating.

Construction sites may have limited electrical power outlets for construction devices. Each of the electrical power outlets provided may be electrically connected to a circuit interrupt to prevent damage to the electrical system. Running or starting too many construction devices on the same circuit may cause the circuit interrupt to open preventing electrical power from being supplied to the circuit, which may have an adverse impact on the construction schedule. Additionally, construction devices may include additional circuit interrupts to prevent damage to the construction device, operator, or electrical distribution system.

BRIEF SUMMARY OF SOME EXAMPLES

In an example embodiment, a construction device scheduling device is provided including processing circuitry configured to receive device identifiers associated with a plurality of construction devices, receive a construction plan, and determine a construction device schedule based on the device identifiers of the plurality of construction devices and the construction plan.

In another example embodiment, a construction device scheduling system comprising a plurality of construction devices and a construction device scheduling device including processing circuitry. The processing circuitry is configured to receive device identifiers associated with the plurality of construction devices, receive a construction plan, and determine a construction device schedule based on the device identifiers of the plurality of construction devices and the construction plan.

In yet another example embodiment, a construction device scheduling device is provided including processing circuitry configured to receive construction site power data comprising line voltage, circuit interrupt rating data, or current data from a sensor network and generate a construction site power status report based on the construction site power data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
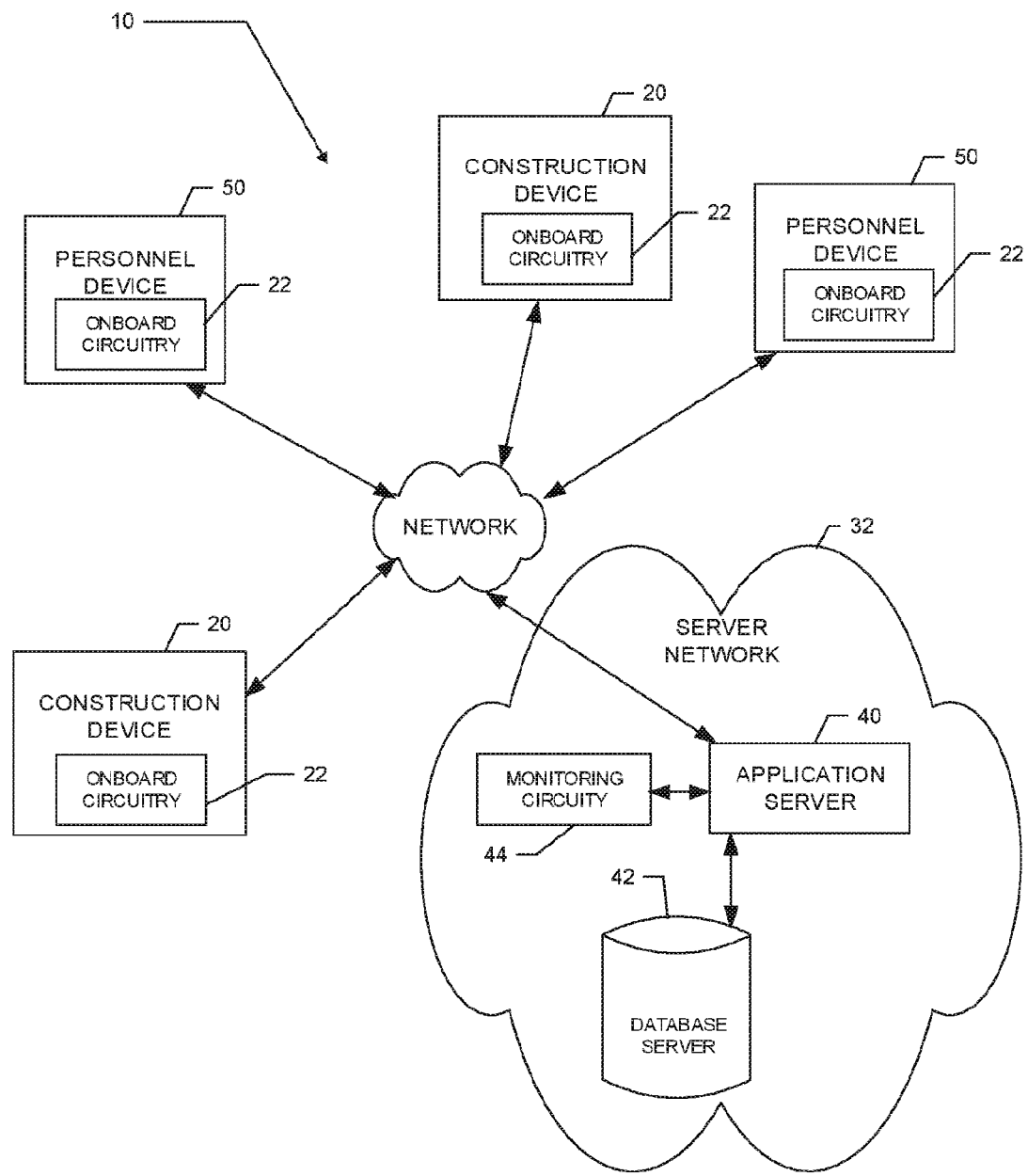
FIG. 1 illustrates a block diagram of a system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction device scheduling device that may be employed on any of a number of different construction devices. The construction device scheduling device may determine a construction device schedule based on device identifiers received from a plurality of construction devices and a site plan. The construction device schedule may prevent construction crews and/or construction devices from being deployed to the same physical area to perform construction device operations that may conflict. The construction device schedule may also be used to ensure the order of construction devices operations, for example, demolition robot, then wall saw, and then drill. The construction device scheduling device may also receive construction site status data associated with the construction device schedule which may be used to enable or disable construction devices as construction device operations are completed or ready to commence. The construction device schedule may be displayed on a user interface for an operator or foreman to monitor progress of the construction device operations and/or enter construction device schedule modifications.

In an example embodiment, the construction device scheduling device may receive construction site power data, such as available power sources and ratings, electrical distribution system layout and ratings, and construction device power requirements or sensor data. The construction device scheduling device may use the construction site power data in determining the construction device schedule to prevent exceeding power limits of the power source, power distribution system, or the like.

In some example embodiments, the construction device scheduling device may generate a construction site power status report based on the construction site power data. The construction site power status report may be displayed on a user interface for use by an operator or foreman. In an example embodiment, the construction device scheduling device may cause a power management action based on the construction site power status report. Power management actions may include ordering an additional generator in an instance in which the power source is near the power rating for a predetermined period of time, preventing a construction device from starting when the current may exceed a circuit interrupt rating, enabling a construction device to start, generating warnings, shutting down a construction device, or the like.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20 and personnel devices 50). Notably, although FIG. 1 illustrates four devices 20, 50 it should be appreciated that many more devices 20, 50 may be included in some embodiments and thus, the four devices 20, 50 of FIG. 1 are simply used to illustrate a multiplicity of devices 20, 50 and the number of devices 20, 50 is in no way limiting to other example embodiments. In this regard, example embodiments are scalable to inclusion of any number of devices 20, 50 being tied into the system 10. Moreover, it should be appreciated that FIG. 1 illustrates one example embodiment in which shared resources may be allocated within a community of networked devices (e.g. devices 20, 50). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50 that are associated with corresponding specific servers that belong to or are utilized by a particular organization, entity or group over a single network (e.g. network 30). However, in other embodiments, multiple different sets of devices 20, 50 may be enabled to access other servers associated with different organizations, entities or groups via the same or a different network.

The devices 20, 50 may, in some cases, each include sensory, computing and/or communication devices associated with different devices 20, 50 that belong to or are associated with a single organization, for example fleet management of devices 20, 50 at a construction site. In another example, a first device 20, 50 may be associated with a first facility or location of a first organization. Meanwhile, a second device may be associated with a second facility or location of the first organization. As such, for example, some of the devices 20, 50 may be associated with the first organization, while other ones of the devices 20, 50 are associated with a second organization. Thus, for example, the devices 20, 50 may be remotely located from each other, collocated, or combinations thereof. However, in some embodiments, each of the devices 20, 50 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a working element. The working element may be operated via the power unit to perform construction operations, such as drilling, cutting, demolishing, nailing, or the like. Various example types of construction devices 20 with which example embodiments may be associated should be understood to have corresponding different types of working elements (e.g. blades, cutting chains, drill bits, nailers, or the like). The construction devices 20 may include sensors for monitoring location, device operation, orientation, or the like, as discussed below in reference to FIG. 2.

Figure 2:
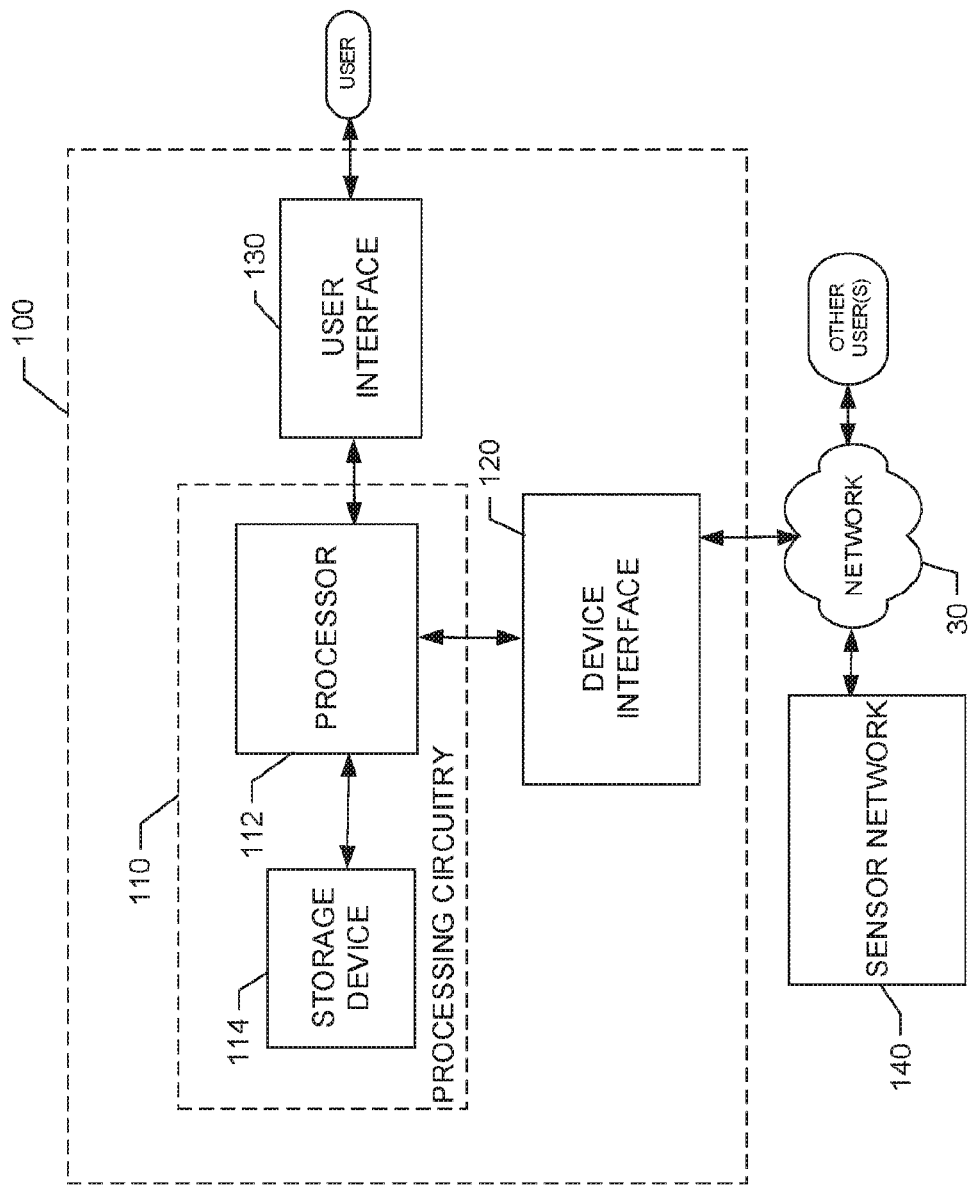
FIG. 2 illustrates a block diagram of one example of onboard electronics or monitoring circuitry that may be used in connection with employment of an example embodiment.

Each of the personnel devices 50 may include sensors, such as location sensors, cameras, scanners, or the like and/or a user interface, as discussed below in reference to FIG. 2. The personnel devices 50 may be useful to monitor a construction device schedule or construction site power status report. In some embodiments, the personnel devices 50 may be a mobile computer, tablet computer smart phone, smart watch, personal digital assistant, or the like.

In an example embodiment, each of the devices 20, 50 may include onboard circuitry 22 which may include or otherwise be embodied as a computing device (e.g. a processor, microcontroller, processing circuitry, or the like) capable of communication with a network 30. As such, for example, each one of the devices 20, 50 may include (or otherwise have access to) memory for storing instructions or applications for the performance of various functions and a corresponding processor for executing stored instructions or applications and a corresponding processor or processing circuitry. Each one of the devices 20, 50 may also include software and/or corresponding hardware (e.g. the onboard circuitry 22) for enabling the performance of the respective functions of the clients as described below. In an example embodiment, one or more of the devices 20, 50 may be configured to execute applications or functions implemented via software for enabling a respective one of the devices 20, 50 to communicate with the network 30 for requesting and/or receiving information and/or services via the network 30 and/or for providing data to other devices via the network 30. The information or services receivable at the devices 20, 50 may include deliverable components (e.g. downloadable software to configure the onboard circuitry 22 of the devices 20, 50, or information for consumption or utilization at the onboard circuitry 22 of the devices 20, 50).

The network 30 may be a data network, such as a local area network (LAN), a metropolitan area network (MAN), a wide area network (WAN) (e.g. the Internet), and/or the like, which may couple the devices 20, 50 to devices such as processing elements (e.g. personal computers, server computers or the like) and/or databases. Communication between the network 30, the devices 20, 50 and the devices or databases (e.g. servers) to which the devices 20, 50 are coupled may be accomplished by either wired or wireless communication mechanisms and corresponding communication protocols.

In an example embodiment, other devices to which the devices 20, 50 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to construction device schedule or construction site power status report generation, as will be described in greater detail below. For example, the application server 40 may be local or remote and configured to receive data from the devices 20, 50 and process the data to coordinate construction site operations, as described herein. Thus, for example, the onboard circuitry 22 may be configured to send the data to the application server 40 for the application server to coordinate construction site operations (e.g. monitor and/or deploy personnel and/or device 20, 50 to locations throughout the construction site), or have actions associated therewith (e.g. send information, alerts, or safety interlocks to devices 20, 50). In some embodiments, the application server 40 may be configured to provide devices 20, 50 with instructions (e.g. for execution by the onboard circuitry 22) for taking prescribed actions when corresponding the construction device schedule or construction site power status report is generated.

Accordingly, in some example embodiments, data from devices 20, 50 may be provided to and analyzed at the application server 40 to identify generate a construction device schedule and/or define a construction site status (CSS) (e.g. in real time or at a later time). The CSS may be associated with actions to be taken by the corresponding one of the devices 20, 50 that sent the data (or another device within the construction site) in response to a future detection of the CSS. The application server 40 may then equip one or more of the devices 20, 50 to detect the defined CSS in the future, and also provide instructions for actions to be taken when the defined CSS is encountered. Each one of the devices 20, 50 that has received the instructions may then detect the defined CSS and take the appropriate action. In one example embodiment, for example, the CSS may include the generation of a construction device schedule based on device identifiers and a construction plan. The construction device schedule may be utilized to enable or disable construction devices based on the construction device schedule or displayed on a user interface. In an example embodiment, the CSS may include the generation of a construction site power status report based on construction site power data. The construction site power status report may be utilized to cause a power management action or displayed on a user interface.

Alternatively or additionally, data from devices 20, 50 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more devices 20, 50 when an occurrence of the defined CSS is detected in the future.

In still other embodiments, the devices 20, 50 themselves may analyze data for detection of CSSs (e.g. using the onboard circuitry 22) and define and/or take action responsive to detecting the occurrence of a defined CSS. Thus, the devices 20, 50 may operate in some cases independently of the network 30 and the application server 40. However, in some cases, the application server 40 may be used to provide defined CSSs to the devices 20, 50 and the devices 20, 50 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a construction device scheduling (CDS) device 100. The CDS device 100 may be embodied in a construction device 20, a personnel device 50, a separate computing device, or be distributed among the devices 20, 50, and/or a separate computing device. The CDS device 100 may include processing circuitry 110 of an example embodiment, as described herein. In this regard, for example, the CDS device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the devices 20, 50. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like.

The device interface 120 may include one or more interface mechanisms for enabling communication with other devices (e.g. sensors of the sensor network 140, or functional units of the CDS device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CDS device 100. In some cases, the device interface 120 may further include wireless communication equipment (e.g. a one way or two way radio) for at least communicating information from the CDS device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CDS device 100 based on inputs received by the processing circuitry 110. As such, in some embodiments, the processor 112 (or the processing circuitry 110) may be said to cause each of the operations described in connection with the CDS device 100 in relation to operation the CDS device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CDS device 100, or any other functional units that may be associated with the CDS device 100. Among the contents of the memory 114, applications may be stored for execution by the processor 112 in order to carry out the functionality associated with each respective application.

In some embodiments, the processing circuitry 110 may communicate with electronic components and/or sensors of a sensor network 140 (e.g. sensors that measure variable values related to device operational parameters like RPM, temperature, oil pressure, and/or the like, and/or sensors that measure device movement employing movement sensor circuitry) of the construction device 20 via the device interface 120. In one embodiment, sensors of the sensor network 140 of one or more ones of the devices 20, 50 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50 based on data provided by the one or more accelerometers and/or gyroscopes, and/or based on GPS or local position determining capabilities. In other words, the movement sensor circuitry may be configured to detect movement of the devices 20, 50 based on inertia-related measurements or other location determining information. In some example embodiments, the movement sensor circuitry may include orientation sensors, configured to detect the orientation of a device, particularly the working element of the device relative a determined location.

Figure 3:
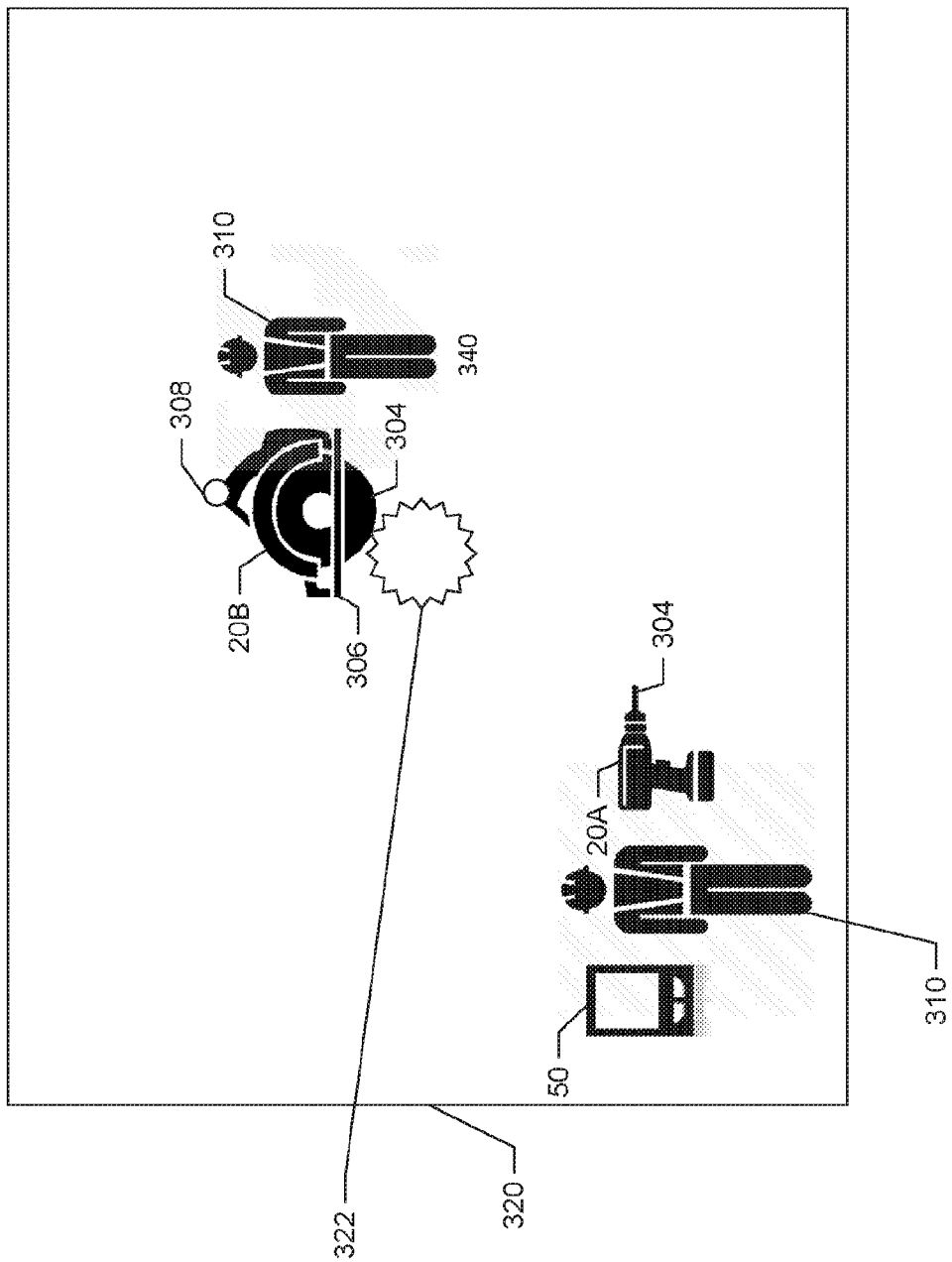
FIG. 3 illustrates an example construction site according to an example embodiment.

FIG. 3 illustrates an example construction site 320 according to an example embodiment. The construction site 320 may include one or more construction devices 20, such as demolition robots, saws, drills, grinders, or the like. The construction device 20 may include a working element 304, such as a blade, drill bit, grinding head, nailer, or the like, configured to perform work, such as pulverizing, cutting, drilling, grinding or fastening, on a working material 322. The CDS device 100 may generate a construction device schedule for a plurality of construction devices 20 based on device identifiers associated with the respective construction devices 20 and a construction plan. Additionally or alternatively, the CDS device 100 may generate a construction site power status report based on construction site power data.

The CDS device 100 may receive device identifiers from the respective construction devices 20. The device identifiers may include data indicative of the make/model, specific device type, generic device type, or the like of a construction device 20, for example Husqvarna DM-230, Core Drill, Drill, or the like. The device identifiers may also be indicative or the physical dimensions of the construction device 20, power ratings, such as voltage, running current, starting current, or the like. The device identifiers may be entered on a user interface, such as user interface 130, may be received from the respective construction devices 20, or received by scanning an identification code, a bar code, QR code, serial number, SKU code, or the like, indicative of the device identifier. In some example embodiments, the device identifiers may be received from a local memory, such as storage device 114, or remote memory, such as database server 42, based on a scanned code.

The CDS device 100 may receive a construction plan from the storage device 114 or database server 42. The construction plan may include the construction site 320, working materials 322, construction device operations for completion of construction items, a construction device operation order, physical dimensions of a work space within the construction site, or the like.

The CDS device 100 may determine a construction device schedule based on the device identifiers and the construction plan. The CDS device 100 may associate the construction devices 20 to construction device operations based on the device identifiers, such as associating a construction device 20 with a device identifier "Husqvarna DM-230, Core Drill", with drilling construction operations. The CDS device 100 may also use the construction device operation order, such as scheduling a demolition robot for demolition, before a wall saw for sawing operations. In some example embodiments, the construction plan may define operations to be completed for a plurality of work spaces within the construction area 320. The CDS device 100 may determine the construction device schedule to minimize delay of construction device operations due to the construction device being used at a different work space based on the construction operation order and device identifiers. In an example embodiment, the physical dimensions of the construction devices 20 and/or work space, may allow for several small construction devices 20 to be used for various construction device operations within a work space, and therefore may be schedule concurrently. In other examples, a large construction device 20 may make it impractical or unsafe to use additional construction devices 20 in the same work space, and therefore not be scheduled concurrently.

In an example embodiment, the CDS device 100 may receive construction site power data. The construction site power data may be CSS data including include line voltage, circuit interrupt ratings, current data, or the like. The circuit interrupt ratings may be received from a user interface 130 as manually entered or selected by an operator 340, received from a construction device 20, such as a portion of the device identifier, or received as a portion of the construction plan. The circuit interrupt data may include voltage, current, or wattage ratings of circuit interrupts, such as fuses, breakers, or the like, and/or electrical power sources, such as a portable generator or electric grid access point. The line voltage or current data may be received from one or more sensors of the sensor network 140, such as in line current or voltage sensors in the electrical power distribution system, or current or voltage sensors 306 associated with the construction devices 20. In some example embodiments, the construction site power data may also include running and starting current ratings associated with one or more construction devices 20, which may be particularly useful for larger construction devices 20 with large starting or running currents. In an example embodiment, the construction site power data may also include the location and/or type of electrical plugs of the electrical distribution system.

In an example embodiment, the CDS device 100 may use the construction site power data in determining the construction device schedule. The CDS device 100 may schedule construction devices 20 based on the running and/or starting current of the construction devices 20 to prevent exceeding a circuit interrupt rating, preventing line voltage from satisfying, e.g. decreasing below, a predetermined voltage threshold due to loading, or the like. In some embodiments, the CDS device 100 may schedule construction devices based on the electrical plugs available, the construction devices 20 which require wired electrical power and/or the type of electrical plugs, e.g. 110 V, 220 V, 440 V, or the like, available and the plug type of the construction device.

In an example embodiment, the CDS device 100 may receive CSS data associated with the construction device schedule. The CSS data may be indicative of the status of a construction device operation or task, such as not started, in progress, complete, or the like. In some embodiments, CSS data may be receive from the user interface 130 as manually entered or selected by an operator 340. In an example embodiment, the CDS device 100 may also receive location data from the respective construction devices 20. The location data may be an actual location or a proximate location, derived from a location sensor, such as a portion of the sensor network 140, associated with the respective construction devices 20. Additionally, sensor data indicative of construction device operations, such as drilling cutting, fastening, or the like, may be receive by the CDS device 100 from a construction device sensor 306. The CDS device 100 may correlate the location data and/or the sensor data indication of a construction device operation with one or more schedule construction device operations of the construction plan. The correlation of the construction device operations and with the location and/or sensor data may be indicative of the status of the construction device operation.

In some example embodiments, the CDS device 100 may enable or disable one or more construction devices 20 based on the construction device schedule. The CDS device 100 may enable construction devices 20A at times or dates at which the construction devices 20 are schedule to perform one or more construction operations. The CDS device 100 may additionally disable construction devices 20B at times or dates at which the construction device 20B is not schedule to perform a construction operation. Disabling a construction device 20B may include electrically, mechanically, or programmatically preventing operation of the construction device 20B.

In an example embodiment, the CDS device 100 may enable or disable the construction devices based further on the CSS data. For example, the CDS device 100 may determine and disable one or more construction devices 20B associated with a first construction operation, in an instance in which the CSS data indicates the first construction operation is complete. The CDS device 100 may determine the construction devices 20A associated with the next construction operation and enable those construction devices 20A.

In an example embodiment, the construction device schedule may be displayed on a user interface 130 for use by the operator 340. The user interface 130 may be associated with the construction device 20, a personnel device 50, or the CDS device 100. In some example embodiments, the construction device schedule may be displayed based on a request by the operator 340, such as a selection in a CDS program or application running on the CDS device 100 or personnel device 50.

Additionally or alternatively, the construction device schedule may be displayed on the user interface 130 automatically, such as in an instance in which a construction operation is completed or commences, a construction device is enabled or disabled, or the like.

In an example embodiment, the CDS device 100 may receive a construction device schedule modification. The construction device schedule modification may be received from the user interface 130, such as in an instance in which an operator (e.g. foreman) changes one or more construction devices 20 associated with a construction operation, the order of construction operations, performance of simultaneous construction operations, or the like. In some example embodiments, the construction device schedule modification may be generated automatically, based on removal of a construction device from service or from the construction site. The CDS device 100 may associate a different construction device 20 with the construction operation for which the originally scheduled construction device 20 is not available. Additionally or alternatively, a construction operation may have a longer or shorter duration than scheduled. The CDS device 100 may adjust the time and construction devices associated with the construction operations to compensate for the availability or lack of availability of work spaces and/or construction devices 20. The adjustment of the time or data and construction devices 20 associated with the construction operations may be optimized to minimize idle operators 310 and/or idle construction devices 20 and minimize use or space conflicts associated with the construction devices 20.

Figure 4:
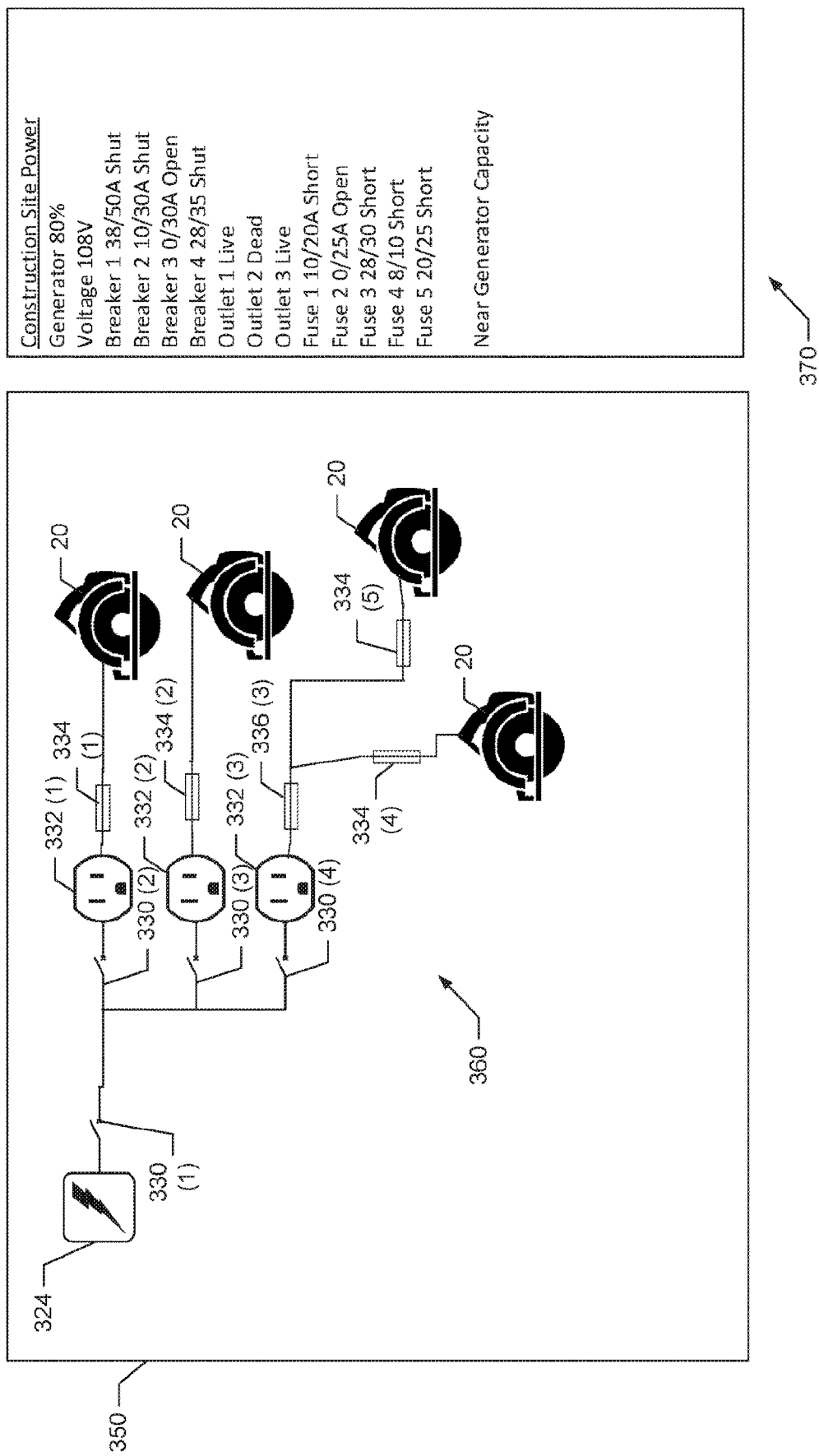
FIG. 4 illustrates a construction site power status report according to an example embodiment.

In some example embodiments, the CDS device 100 may, additionally or alternatively, generate a construction site power status report, such as depicted in FIG. 4. The construction site power status report may include a diagram 350 of the electrical distribution system 360 and/or a parameter display 370. The electrical distribution system 360 may include electrical power sources 324; circuit interrupts, such as breakers 330 and fuses 334; electrical plugs 332; construction devices 20; or the like. The electrical power sources 324 may include portable generators or electric grid access. The breakers 330 may include main line breakers 330 (1), branch breakers 330 (2-4), local breakers, or the like. The fuses 334 may include fuses 336 (3) in components of the electrical distribution system, such as in a electrical panel or extension cord, or the like; fuses 336 (1-2, 4-5) associated with a construction device 20, or the like. In some example embodiments, the diagram 350 may include electrical plugs 332 and/or electrical plug types. In some instances, the diagram 350 may include the locations of the electrical plugs 332.

The parameter display 370 may include the power consumption of the electrical distribution system 360, such as a percent or fraction of the power rating of the electrical power source 324. In some example embodiments, the parameter display 370 may include line voltage of the electrical distribution system 360, such as 108 V on a 110 V rated system.

In an example embodiment, the parameter display 370 may include descriptions of the circuit interrupts, which may in turn include a current rating, current sensed, status of the circuit interrupt, or the like. In some example embodiments, the parameter display 370 may include descriptions of electrical plugs 332, and in some instances the power status, e.g. dead or live, associated with the electrical plugs 332.

In an example embodiment, the CDS device 100 may cause a power management action based on the construction site power report. The power management action may be a warning, such as current nearing a circuit interrupt rating, low line voltage, nearing an electrical power source capacity, or the like. The warning may be an indicator 308 on a construction device, such as a light or plurality of lights, tactile feedback or the like, or a warning displayed on the user interface 130.

In some example embodiments the power management action may include disabling or shutting down a construction device 20 to prevent the running or starting current from exceeding a circuit interrupt rating, or running a construction device with line voltage below a predetermined value. In some example embodiments, the CDS device 100 may be configured to order additional electrical power sources 324, e.g. portable generators. The CDS device 100 may order additional electrical power sources 324. The additional power sources may be ordered, in an instance in which the construction site power status report indicates the electrical power source 324 is near a rated power capacity, or construction site operations scheduled in the construction device schedule may cause the electrical power source to exceed the rated power capacity.

In some example embodiments, the CDS device 100 may cause the construction site power status report to be displayed on the user interface 130. The user interface 130 may be associated with the construction device 20, the personnel device 50, or the CDS device 100. In some example embodiments, the construction site power status report may be displayed based on a request by the operator 310, such as a selection in a CDS program or application running on the CDS device 100 or personnel device 50.

Additionally or alternatively, the construction site power status report may be displayed on the user interface 130 automatically, such as in an instance in which a construction operation is completed or commences, a construction device is enabled or disabled, a power management action is caused, or the like.

Figure 5:
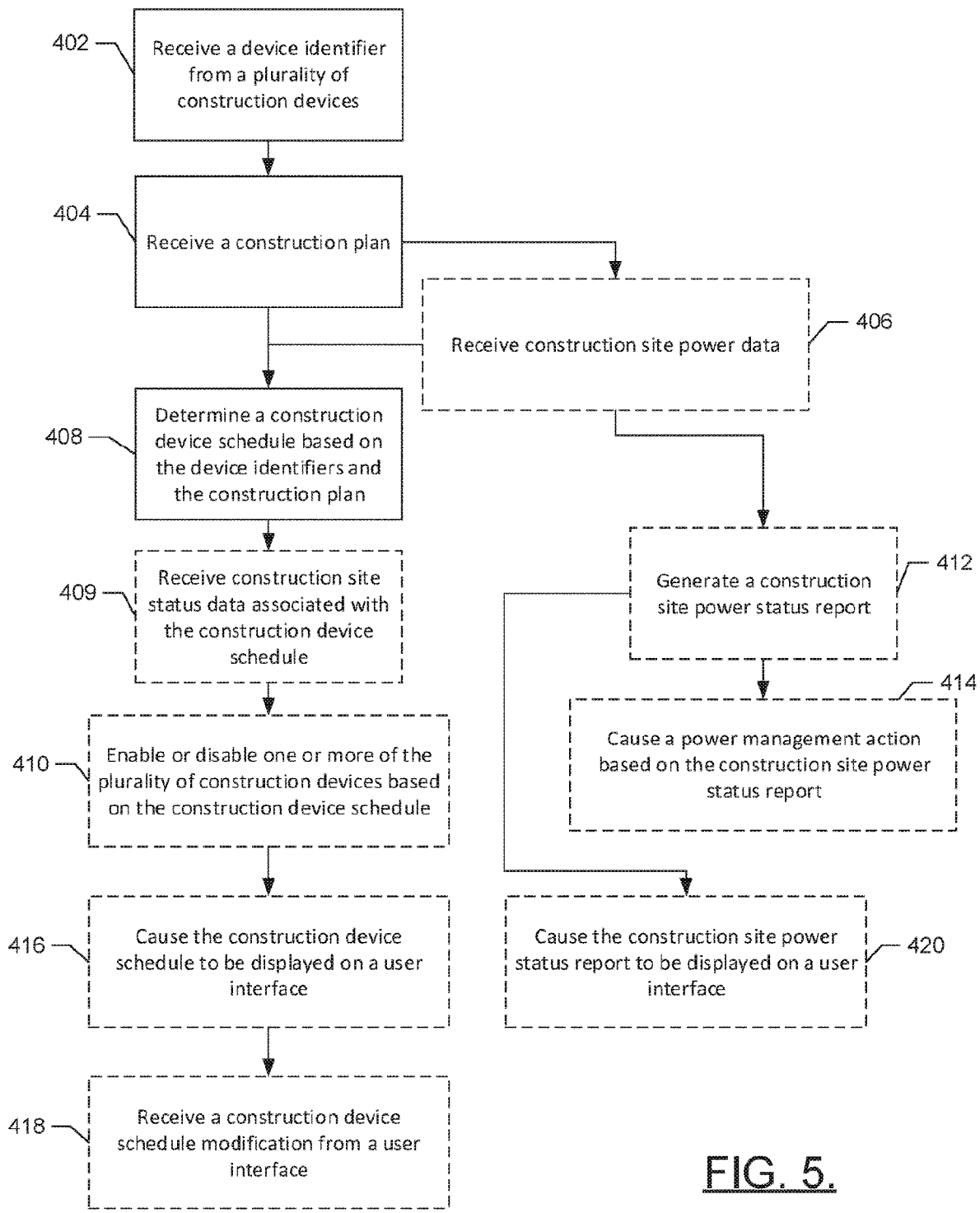
FIG. 5 illustrates a method of utilizing a construction device scheduling device in relation to operation of construction devices according to an example embodiment.

In some cases, a method of utilizing CSS analysis in relation to operation of the CDS device 100 and/or one or more construction devices 20 according to an example embodiment may be provided. FIG. 5 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CDS device 100 and/or the one or more construction tools according to the method.

In an example embodiment, the method may include receiving a device identifier from a plurality of construction devices at operation 402, receiving a construction plan at operation 404, and determining a construction device schedule based on the device identifiers and the construction plan at operation 408.

In some embodiments, the method may include additional, optional operations, and/or the operations described above may be modified or augmented. Some examples of modifications, optional operations, and augmentations are described below, as indicated by dashed lines, such as, receiving construction site power data at operation 406, receiving CSS data associated with the construction device schedule at operation 409, enabling or disabling one or more construction devices based on the construction device schedule at operation 410, and generating a construction site power status report at operation 412. In an example embodiment, the method may also include causing a power management action based on the construction site power status report at operation 414. In some example embodiments, the method may also include causing the construction device schedule to be displayed on a user interface at operation 416, receiving construction devices schedule modifications from a user input at operation 418, and causing the construction site power status report to be displayed on a user interface at operation 420. In an example embodiment, the CDS device may comprise a processor (e.g. the processor 112) or processing circuitry 110 configured to perform some or each of the operations (402-420) described above. The processor 112 may, for example, be configured to perform the operations (402-420) by performing hardware implemented logical functions, executing stored instructions, or executing algorithms for performing each of the operations. In some embodiments, the processor 112 or processing circuitry 110 may be further configured for additional operations or optional modifications to operations 402-420. In this regard, in an example embodiment, the processing circuitry is further configured to enable or disable one or more of the plurality of construction devices based on the construction device schedule. In an example embodiment, the processing circuitry is further configured to receive CSS data associated with the construction device schedule and enable or disable the one or more construction device is further based on the construction status. In some example embodiments, the CSS data comprises location data of at least one construction device of the plurality of construction devices. In an example embodiment, the CSS data comprises operation data of at least one construction device of the plurality of construction devices, for example RPM of the working element, temperature, construction device condition, such as in use or idle, or the like. In some example embodiments, the processing circuitry is further configured to receive construction site power data and the construction device schedule is further based on the construction site power data. In an example embodiment, the construction site power data comprises line voltage, current data, or circuit interrupt data. In some example embodiments, the power data comprises a fuse rating associated with at least one construction device of the plurality of construction devices. In an example embodiment, the processing circuitry is further configured to receive a construction device schedule modification from a user interface. In some example embodiments, the processing circuitry is further configured to cause a power management action based on the construction site power status report.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A construction device scheduling device comprising processing circuitry configured to:
   receive a plurality of device identifiers, each one of the plurality of the device identifiers associated with a respective one of a plurality of construction devices;
   receive a construction plan;
   receive construction site power data, the construction site power data comprising a running current or a starting current of each one of the plurality of construction devices, the construction site power data further comprising a plan of an electrical distribution system configured to provide construction power to the plurality of construction devices; and
   determine a construction device schedule based on the plurality of the device identifiers, the construction site power data, and the construction plan;
   wherein the construction device schedule defines or directs actions to be taken by the plurality of construction devices in the work space based on the electrical distribution system and the running current or the starting current required by each respective one of the plurality of construction devices to maintain compliance with one or more circuit interruption current ratings of the electrical distribution system or a threshold minimum line voltage on the electrical distribution system.

2. The construction device scheduling device of claim 1, wherein the processing circuitry is further configured to:
enable or disable one or more of the plurality of construction devices based on the construction device schedule.

3. The construction device scheduling device of claim 2, wherein the processing circuitry is further configured to:
receive construction site status data associated with the construction device schedule, the construction site status data comprising location data of one or more of the plurality of construction devices.

4. The construction device scheduling device of claim 3, wherein the construction site status data further comprises operation data of one or more of the plurality of construction devices.

5. The construction device scheduling device of claim 1, wherein the construction site power data further comprises a fuse rating associated with each one of the plurality of construction devices.

6. The construction device scheduling device of claim 1, wherein the processing circuitry is further configured to:
receive a construction device schedule modification from a user interface.

7. The construction device scheduling device of claim 1, wherein the construction plan comprises physical dimensions of a work space within a construction site in which the plurality of construction devices are operational.

8. The construction device scheduling device of claim 1, wherein the plan of the electrical distribution system includes locations and types of electrical plugs on the construction site.

9. The construction device scheduling device of claim 3, wherein the construction device schedule is further based on the construction site status data.

10. The construction device scheduling device of claim 1, wherein the processing circuitry is further configured to determine the construction device schedule based on a construction device operation order in the construction plan.

11. The construction device scheduling device of claim 1, wherein at least one construction device is a demolition robot configured to perform a demolition action.

12. The construction device scheduling device of claim 1, wherein the processing circuitry is further configured to determine the construction device schedule based on positions of the construction devices and users of the construction devices in compliance with threshold safety distances.

13. The construction device scheduling device of claim 1, wherein the processing circuitry is further configured to generate an order for additional portable power sources based on the construction device schedule, the device identifiers, the construction site power data, and the construction plan.

14. A construction device scheduling system comprising:
a plurality of construction devices operational on a construction site; and
a construction device scheduling device comprising processing circuitry configured to:
receive a plurality of device identifiers, each one of the plurality of the device identifiers associated with a respective one of a plurality of construction devices;
receive a construction plan of the construction site;
receive construction site power data, the construction site power data comprising a running current or a starting current of each one of the plurality of construction devices, the construction site power data further comprising a plan of an electrical distribution system configured to provide construction power to the plurality of construction devices; and
determine a construction device schedule based on the plurality of the device identifiers, the construction site power data, and the construction plan;
wherein the construction device schedule defines or directs actions to be taken by the plurality of construction devices in the work space based on the electrical distribution system and the running current or the starting current required by each respective one of the plurality of construction devices to maintain compliance with one or more circuit interruption current ratings of the electrical distribution system or a threshold minimum line voltage on the electrical distribution system.

15. The construction device scheduling system of claim 14, wherein the processing circuitry is further configured to:
receive construction site status data associated with the construction device schedule, the construction site status data comprising location data of one or more of the plurality of construction devices.

16. The construction device scheduling system of claim 14, wherein the construction site power data further comprises a fuse rating associated with each one of the plurality of construction devices.

17. The construction device scheduling system of claim 14, wherein the processing circuitry is further configured to:
receive a construction device schedule modification from a user interface.

18. The construction device scheduling device of claim 7, wherein the construction plan further comprises a list of construction device operations for completion in the work space, and wherein the construction device schedule defines or directs the actions to be taken by the one or more of the plurality of construction devices in the work space based on the list of construction device operations.

19. The construction device scheduling system of claim 14, wherein the construction plan comprises physical dimensions of a work space within the construction site in which the plurality of construction devices are operational.

20. The construction device scheduling system of claim 19, wherein the construction plan further comprises a list of construction device operations for completion in the work space, and wherein the construction device schedule defines or directs the actions to be taken by the one or more of the plurality of construction devices in the work space based on the list of construction device operations.

* * * * *